United States Patent [19]

Martucci

[11] 4,180,789
[45] Dec. 25, 1979

[54] TIME VARIABLE THERMOSTAT
[76] Inventor: Frank Martucci, 360 Tom Hunter Rd., Fort Lee, N.J. 07024
[21] Appl. No.: 923,067
[22] Filed: Jul. 10, 1978
[51] Int. Cl.² .............................................. H01H 37/62
[52] U.S. Cl. .................................... 337/301; 337/303
[58] Field of Search ................ 337/301, 302, 303, 304

[56] References Cited
U.S. PATENT DOCUMENTS

| | | | |
|---|---|---|---|
| 2,832,870 | 4/1958 | Kucera | 337/302 |
| 3,043,936 | 7/1962 | Page | 337/303 |
| 3,258,552 | 6/1966 | Hanris | 337/302 X |

FOREIGN PATENT DOCUMENTS 1188199  4/1970  United Kingdom ..................... 337/304

Primary Examiner—George Harris
Attorney, Agent, or Firm—Constantine A. Michalos; Peter C. Michalos

[57] ABSTRACT

A time variable thermostat for controlling a heater comprising, a temperature activated switch connected to the heater for deactivating the heater at a selected temperature having a movable contact and at least one fixed contact, the movable contact being moved into abutment with the fixed contact when a temperature other than the selected temperature is reached to activate the heater and moved into abutment with the fixed contact to deactivate the heater when the selected temperature is reached. A temperature selection arm is connected to the movable contact and associated with a scale for selecting the temperature at which the movable contact is moved out of abutment with the fixed contact. The thermostat further includes a clock motor having a shaft rotated once in 24 hours, a temperature selection disc centrally mounted on the shaft and in frictional contact therewith having a plurality of radially extending slots therein, and an arm engagement member slidable within each of the radially extending slots and in frictional contact with the disc for abutment against the temperature selection arm. Each arm engagement member is positionable at a radial location along its associated slot which corresponds to a selected temperature. A spring is provided between the temperature selection arm and a fixed point on the thermostat for biasing the temperature selection arm against the arm engagement member. The plurality of slots are circumferentially spaced around the disc so that the temperature selection arm always abuts against at least one arm engagement member during the 24 hour period.

9 Claims, 4 Drawing Figures

TIME VARIABLE THERMOSTAT

BACKGROUND OF THE INVENTION

1. Field Of The Invention

The present invention relates in general to thermostats and in particular, to a new and useful time variable thermostat for constantly adjusting the temperature at which a heating and or cooling unit is activated.

2. Description Of The Prior Art

Thermostats which control the operation of a heating and or cooling unit are known which include a manual setting for setting a selected temperature to be maintained within a dwelling or building. Thermostats with timers are also known for maintaining a selected temperature during the day and a different selected temperature, usually lower than the former mentioned selected temperature, during the night. These thermostats usually include two members, one positionable adjacent a daytime temperature on a scale and the other positionable adjacent a night time temperature on another or the same scale.

Available thermostats, having two settings, do not have the flexibility to, for example, close down a heating unit when occupants of the building leave for the day. Therefor no energy saving provision is made in presently available thermostats for selecting a comfortable and suitable temperature in a building which is particularly suited to a user's schedule. Further, a considerable amount of energy is consumed in changing from, for example, a low night time temperature to a high day time temperature. The provision of a gradual increase in temperature as controlled by a thermostat would reduce fuel consumption by avoiding thermal shock and overrides which is prevalent in presently available thermostats.

SUMMARY OF THE INVENTION

The present invention comprises a time variable thermostat which is programable to establish a continuous time varied gradient of temperatures within a building which is equipped with a heating and or cooling unit.

The time variable thermostat, in accordance with the invention includes a temperature activated switch having a movable contact and a fixed contact. The movable and fixed contacts are electrically connected to a heating and or cooling unit for activating the same. The temperature activated switch can be set at a selected temperature so that, when the selected temperature is reached in a building equipped with the time variable thermostat, the movable contact is moved out of abutment with the fixed contact so that the heater and or cooling unit is deactivated. When a temperature other than the selected temperature exists in the building, the movable contact moves into abutment with the fixed contact thereby activating the heating and or cooling unit until the selected temperature is once again reached. A clock motor is provided in the thermostat which includes a shaft rotated through 360° once during a 24 hour period. A circular disc is centrally mounted on the clock shaft and includes a plurality of radially extending slots which are circumferencially spaced around the disc. A temperature selection arm is connected to the movable contact of the temperature activated switch and extends to a scale showing a range of selectable temperatures. An arm abutment member is slidably mounted within each radially extending slot on the disc and the temperature selection arm is abutable against at least one of the arm engagement members. Each arm engagement member is in frictional contact with the disc and positionable at a radial location along the disc which corresponds with a preselected temperature on the temperature scale. A number of slots corresponding, for example, with the number of hours in a day, are positioned circumferencially around the disc and the temperature selection arm is abutable against at least one of the arm engagement members at all times. A programmed temperature gradient can thereby be set circumferentially around the disc so that a timed temperature can be applied to the thermostat for an entire 24 hour period.

The temperature gradient can realize a gradual temperature change in a building throughout the day to avoid any harsh temperature changes which would otherwise occur when the prior art thermostats change from a daytime selected temperature for example, to a night time selected temperature. The degree of freedom available in the temperature programing also permits a fine tuning of the temperature in a dwelling which varies during the day and corresponds with a comfortable temperature for individuals utilizing the time variable thermostat.

An other feature of the present invention provides a manual scale into which the temperature selection arm is engagemable after being disengaged from the time selection disc of the device. A spring is also provided between the time selection arm and a fixed point on the thermostat for continuously biassing the temperature selection arm against the arm engagement members when the temperature selection arm is in abutment therewith. A friction slide is provided in the manual scale for counter acting the effect of the biassing spring when the temperature selection arm is disengaged from the temperature selection disc and engaged in the manual scale.

Accordingly, an object of the present invention is to provide a time variable thermostat for controlling a heater comprising, a temperature activated switch connected to the heater for activating the heater at a selected temperature having a movable contact and a fixed contact, a temperature selection arm connected to said movable contact for moving said movable contact out of contact with said fixed contact and deactivating the heater when a temperature is reached which corresponds to the selected temperature and moving the movable contact into contact with the fixed contact for activating the heater when a temperature other than the selected temperature is reached, a clock motor having a shaft rotatable once in 24 hours associated with the temperature selection arm, a temperature selection disc centrally mounted and a friction cotact with said shaft having a plurality of circumferentially spaced and axially extending slots therethrough, an arm engagement means slidably mounted within each shaft and in frictional contact with said disc, said temperature selection arm being in abutment with at least one of said arm engagement means, said arm engagement means being positionable at a radial position along each slide which corresponds to a selected temperature, and biassing means connected to said temperature selection arm for biassing said temperature selection arm toward said arm engagement means. A further object of the present invention is to provide a time variable thermostat which includes a number of radially extending slots sufficient to have one slot per each half hour during a 24 hour period so that a temperature selection is made through said temperature selection arm at least once in every half hour during a 24 hour period.

A further object of the present invention is to provide a time variable thermostat which is further connected to a cooling unit and which further includes a second fixed contact for activating the cooling unit when the temperature rises above a selected temperature.

A further object of the present invention is to provide a time variable thermostat which is simple in design, rugged in construction, and economical to manufacture.

The various features of novelty which characterize the present invention are pointed out with particularity in the claims annexed to and forming a part of this disclosure. For a better understanding of the invention, its operating advantages, and specific objects attained by its uses, reference should be made to the accompanying drawings and descripted matter in which there is illustrated a preferred embodiment of the invention.

DESCRIPTION OF THE PREFERRED EMBODIMENT

Figure 1:
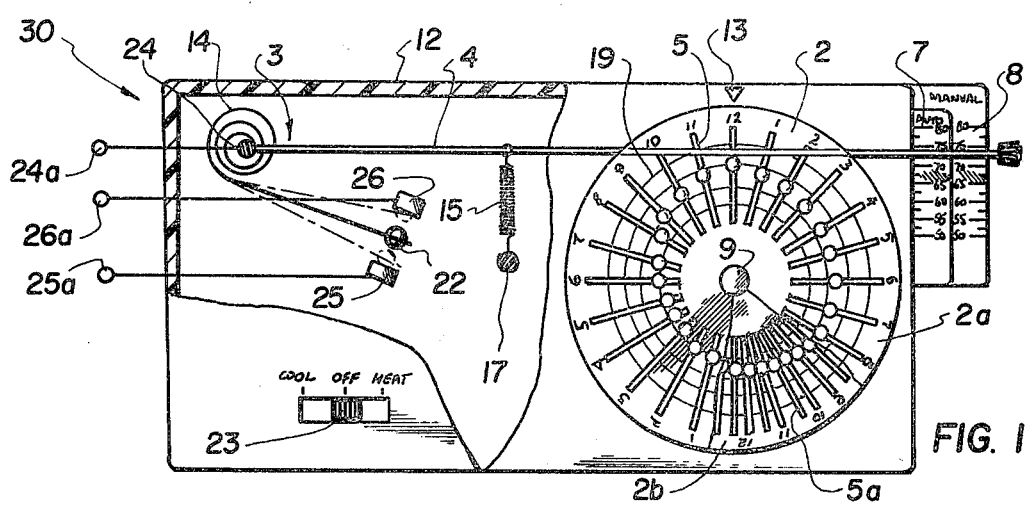
FIG. 1 is a front elevational view with portions cut away of a thermostat constructed in accordance with the invention.

Referring now to the drawings, the invention embodied therein in FIG. 1 comprises, a thermostat generally designated 30 having a housing 12 with a temperature activated switch generally designated 3 therein and including a rotatably mounted programing disc 2 which is mounted for rotation with respect to the housing 12.

Figure 2:
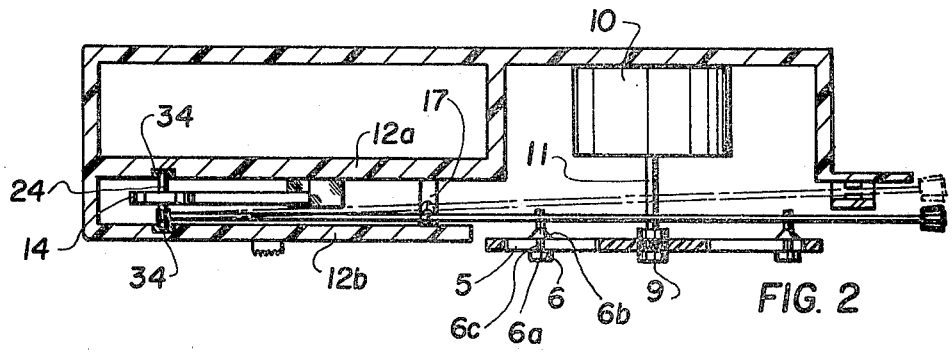
FIG. 2 is a top sectional view of the embodiment shown in FIG. 1.

The temperature actuated switch 3 includes a bimetal temperature sensitive coil 14 which is connected to a shaft 24 which in turn is rotatably mounted between frictionless bearings 34, 34 respectively mounted on housing wall portions 12a and 12b of housing 12 as best seen in FIG. 2. Bimetal coil 14 terminates at its one end on shaft 24 and at its opposite end at switch contact 22. Coil 14 is of known design and reacts to temperature by expanding and contracting thereby displacing switch contact 22 either downwardly or upwardly as viewed from FIG. 1. Associated with switch contact 22 are a cooler contact 25 and a heater contact 26. Cooler contact 25 is connected through a lead to a terminal 25a which in turn is connected to a cooling or air conditioning unit not shown. Heater contact 26 is connected through a line to heater terminal 26a which is in turn connected to a heating unit also not shown. Shaft 24 which is electrically connected to switch terminal 22 through coil 14, is connected through a lead to a common terminal 24a which is in turn connected to a common terminal on the heater and cooler units. In operation if an ambient room temperature increases above a selected temperature selected for the thermostat, coil 14 expands thereby causing contact 22 to engage with cooler contact 25 and thereby actuate the air conditioner unit. Conversely, if the temperature in a room falls below a selected temperature, the coil 14 contracts thereby causing contact 22 to engage with contact 26 and activate the heater unit. It will be understood that either the heater or cooler unit can be used independently and without the other and that for simplicity both unit connections are shown in the figures.

A temperature selector arm 4 is connected to shaft 24 and extends across the thermostat housing 12. Arm 4 is biassed downwardly in FIG. 1 by a spring 15 connected between the arm 4 and a stationary post 17 which is integral with the housing 12. As best seen in FIG. 2, a clock motor 10 is mounted within the housing 12 and includes a clock shaft 11 which rotates once in 24 hours. Temperature programing disc 2 is frictionally mounted to a hub 9 which is connected to shaft 11. Disc 2 thus, normally rotates with shaft 11 and makes a complete revolution in 24 hours. The frictional engagement between hub 9 and disc 2 however, permits the manual rotation of disc 2 with respect to shaft 11 so that the proper time can be set for the disc 2 by positioning a present time as indicated on the periphery 2a of disc 2 with a present time indicator 13 mounted on the housing 12. Disc 2 is thus set to show the correct time to permit the temperature programing operation.

Temperature programing disc 2 includes a plurality of radially extending and circumferencially spaced slots 5 which are either positioned at every hour position around disc 2 thus providing 24 distinct temperature setting locations or as shown in a broken portion 2b of disc 2, an alternative form of the invention is to provide a slot 5a at every half hour location or therefore have 48 temperature selection locations around the disc 2b.

A temperature selection pin 6 is slidably mounted and in frictional engagement with disc 2 in each slot 5. Each pin includes a head portion 6a and a base portion 6b which engage around the surface of disc 2 and which are connected through a shaft 6c which extends through the slot 5. Disc 2 is provided with circumferencial scale markings 19 which correspond to the temperature markings on an automatic scale 7.

In operation, each pin 6 may be slid along its associated slot and positioned along a position on scale 19 to correspond with a temperature position on automatic scale 7. This selection is made in accordance with the temperature desired for a particular hour in a 24 hour period. By selecting the temperature desired at each hour or half hour interval, a user may program the temperature programing disc 2 to provide a desired temperature gradient which is time variable throughout an entire day. Arm 4, which is biassed downwardly by spring 15 bears against each pin 6 which is adjacent the time indicator 13 at any particular time. The temperature therefore as selected by the positioning of pin 6 is defined for the coil 14 which determines by the positioning of its contact 22 whether the heater or air conditioner is to be engaged to change the ambient room temperature in accordance with the selected temperature. The programing of the thermostat 30 therefore can be accomplished so that, for example, a higher temperature can be maintained during the day and a gradually lower temperature maintained during the evening and night which is gradually increased as morning approaches. Thistemperature selection permits the fine tuning of a temperature gradient existing in a building to a users exact requirements.

Thermostat 30 is also provided with a manual switch 23 for selectively engaging either the air conditioner or heater manually or permitting the automatic operation of the thermostat.

Figure 3:
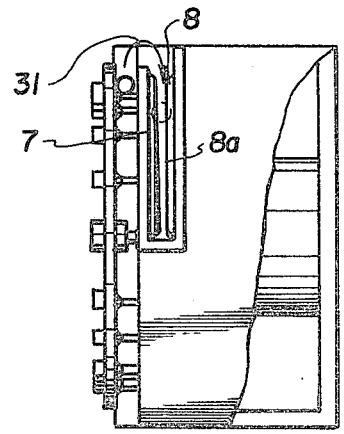
FIG. 3 is a side elevational view with portions cut away of the embodiment shown in FIG. 1.

The thermostat may also be used to maintain a selected temperature constantly throughout the day by taking the temperature selector arm 4 out of engagement with the disc 2 and its pin 6 and into engagement with a manual slide 21 having a manual scale 8. This is accomplished by lifting arm 4 over automatic scale 7 and into slot 8 as indicated by arrow 31 in FIG. 3. Slide 8 includes frictional contacts 8a which are engaged on either side of arm 4 and thereby counter act to the bias of spring 14 and permit arm 4 to be positioned, in a stationary manner adjacent a selected temperature shown on manual scale 8.

Figure 4:
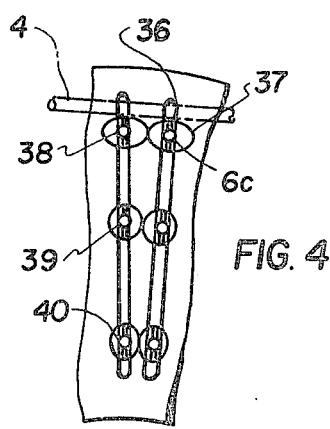
FIG. 4 is a detailed enlarged view of another embodiment of the temperature selection pins in accordance with the invention.

Referring now to FIG. 4, each pin shaft 6c may be provided with a flexible annual sleeve 37 which is connected through flexible members 36 to the shaft 6c. While in the position shown at 38, the flexible sleeve 37 is oval in configuration and of a size sufficient so that adjacent sleeves 37 on adjacent pins 6 abut against each other. This permits a continuous surface on which the arm 4, shown in phantom, can bear. As pins 6 are positioned radially inwardly toward the center hub 9 at respective positions 39 and 40, the flexible sleeves 37 maintain their engagement with each other and distort accordingly. The engagement between adjacent pins permits the continuous support of the arm 4 and prevents any large displacement of 4 causing this advantageous temperature fluctuations as disc 2 rotates.

The prevision of a constantly programed temperature selection as provided in the present invention, also has advantages in economizing on fuel utilized in, for example, a heating unit. The reason for this, is that with the normal day/night temperature selection thermostats, a difference in temperatures of up to 15° can be set between the daytime temperature desired and the night time temperature desired. This large temperature difference which must be satisfied within a short period of time causes overtaxing of the heating system especially during the moring when the temperature is increased which causes an extra waste of fuel, not realized in practicing the present invention. By providing a gradual temperature increase, a thermal shock is not realized and energy is saved.

While specific embodiments of the invention have been shown and described in detail to illustrate the application of the principles of the invention, it will be understood that the invention may be embodied otherwise without departing from such principles.

What is claimed is:

1. A time variable thermostat for controlling a heater comprising, a temperature actuated switch connected to the heater for actuating the heater at a selected temperature having a movable contact and at least one fixed contact, said movable contact being moved out of engagement with said fixed contact when the selected temperature is reached to deactivate the heater and being movable into engagement with the fixed contact to activate the heater when a selected temperature has not been reached, a temperature selection arm connected to said movable contact for selecting the temperature at which said movable contact is out of engagement with said fixed contact, a clock motor having a shaft rotatable once in 24 hours associated with said temperature selection arm, a temperature selection disc connected to said shaft having a plurality of radially extending slots, at least one arm engagement pin slidably mounted within each of said slots and engageable with said temperature selection arm, each of said arm engagement pins being radially positionable along said associated slot which corresponds to a selected temperature, and biasing means biassing said temperature selection arm against at least one of said arm engagement pins.

2. A thermostat according to claim 1 wherein said temperature selection disc is in frictional engagement with said shaft to permit a relative rotation between said disc and said shaft and wherein said arm engagement pins are each in frictional contact with said disc.

3. A thermostat according to claim 1 further including a manual temperature selection slide spaced from said temperature selection disc having at least one friction slide engageable with said temperature selection arm when said temperature arm is disengaged from the arm engagement pins of said temperature selection disc.

4. A thermostat according to claim 1 further including a second fixed contact connected to a cooling unit and positioned on a side of said movable contact opposite from said former mentioned fixed contact, said movable contact further comprising a bimetal coil which is expandable and contractable with temperature variations to move said movable contact.

5. A thermostat according to claim 1 wherein each arm engagement pin includes an annular flexible sleeves portion, with annular sleeves portions of adjacent arm engagement pins in contact with each other for supporting said temperature selection arm.

6. A thermostat according to claim 1 including an annular temperature scale disposed on said disc.

7. A thermostat according to claim 1 including 24 circumferencially spaced slots each corresponding with an hour during a 24 hour period.

8. A thermostat according to claim 1 wherein said temperature selection disc includes 48 circumferencially spaced slots one for each half hour period during a 24 hour period.

9. A thermostat according to claim 1 further including a manual switch for manually engaging the heater, a cooler contact for connection to a cooling unit spaced from said former mentioned fixed contact, said manual switch also positionable to manually engaged the cooler.

* * * * *